United States Patent Office 3,562,260
Patented Feb. 9, 1971

3,562,260
2-CARBONYL-ESTRATRIENES AND METHOD OF THEIR PREPARATION
Pietro De Ruggieri, Carmelo Gandolfi, and Umberto Guzzi, Milan, Italy, assignors to Ormonoterapia Richter S.p.A., Milan, Italy, a corporation of Italy
No Drawing. Filed Aug. 16, 1966, Ser. No. 572,665
Claims priority, application Italy, Aug. 23, 1965, 18,855/65
Int. Cl. C07c *169/10, 173/00*
U.S. Cl. 260—239.55
19 Claims

ABSTRACT OF THE DISCLOSURE

Novel 2,3-disubstituted cholesta-1,3,5(10)-trienes and estra-1,3,5(10)-trienes and methods for their preparation. These compounds are useful as estrogens, anti-cholesterolemic agents, hypophyse blocking agents and antiandrogens.

The present invention relates to the compounds of the following formula:

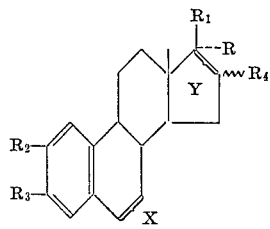

wherein the steroidal ring A, that is the one having $R_2$ and $R_3$ substituents, is an aromatic ring which being mesomeric is indiscriminately 1,3,5(10) or 2,4,10(1)-triene and wherein R, $R_1$, $R_2$, $R_3$, $R_4$, X and Y are as follows:

R=hydrogen, lower alkyl, —CH=CH—$R_a$, —C≡C—$R_a$, OH, 2′-tetrahydropyranyloxy

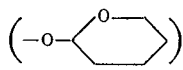

or acyloxy wherein the acyl radical is derived from a saturated or unsaturated carboxylic acid having 2 to 10 carbon atoms;
$R_1$=hydrogen, hydroxy, 2′-tetrahydropyranyloxy

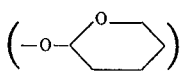

lower alkoxy, acyloxy wherein the acyl radical is derived from a saturated or unsaturated carboxylic acid having 2 to 10 carbon atoms are from phenylacetic, phenylpropionic, phenylpropiolic, (cis and trans)cinnamic, benzoic, salicylic or p-amino benzoic acids, or $C_8H_{17}$; or
R and $R_1$ together may be 17-keto or 17,17-ethylenedioxy;
$R_2$=formyl, —CH=NOH, nitrile, —$CH_2NH_2$, —CH=$NR_b$, —$CH_2NHR_b$, —$COOR_a$, CO—$NH_2$, CO—$NHNHC_6H_5$, $CONHNH_2$, $CON_3$, or —CON $(R_b)_2$;
$R_3$=hydrogen, 2′-tetrahydropyranyl

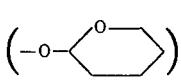

lower alkyl, $C_6H_5CH_2$— or a acyl radical derived from a saturated or unsaturated carboxylic acid having 2 to 10 C atoms, or from phenylacetic, phenylpropionic, phenylpropiolic, (cis and trans) cinnamic, benzoic, salicylic or p-amino-benzoic acids;
$R_4$=H, Cl, Br, I, methyl, allyl, propyl, ethyl or hydroxy; and are each selected from the group consisting of a single and a double bond, $R_a$ being hydrogen or lower alkyl and $R_b$ being lower alkyl, aryl or aralkyl.

The compounds which are the subject of the present invention and which can find a useful application as estrogens, anticholesterolemic drugs, hypophyse blocking agents and antiandrogens are prepared by starting from the compounds of the following formula:

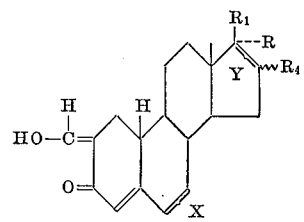

wherein R, $R_1$, $R_4$, X and Y have the same meaning as above.

The 2-hydroxy-methylene-$\Delta^4$-3-keto-19-nor-steroids are reacted in solvents, such as benzene and dioxane, with hydrogen acceptors, such as the quinones of the dichlorodicyanobenzoquinone (DDQ) and tetrachlorobenzoquinone (chloranyl) type, and undergo dehydrogenation with aromatization of the steroidal ring A to give compounds of the following formula:

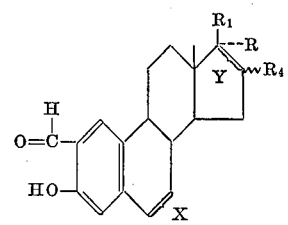

wherein R, $R_1$, $R_4$, X and Y have the same meaning as above.

These steroidal 2-formyl-3-ol-1,3,5(10)-trienes react with the chlorides and the anhydrides of appropriate acids to give the 3-acyl derivatives according to the following scheme:

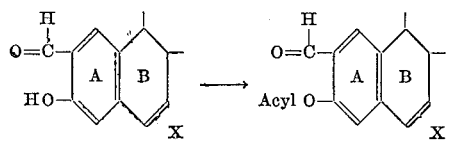

They also react with alkyl halides and sulfates, such as $CH_3I$, $(CH_3)_2SO_4$, $C_2H_5Br$, etc. or aralykyl halides, such as $C_6H_5CH_2Cl$, in alcoholic, or aqueous alcoholic solution, or in benzene or toluene, in the presence of bases such as $K_2CO_3$, KOH, NaOH and of $Ag_2CO_3$ to give the corresponding ethers:

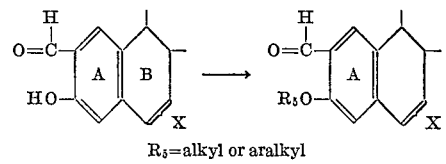

$R_5$=alkyl or aralkyl

According to the following scheme:

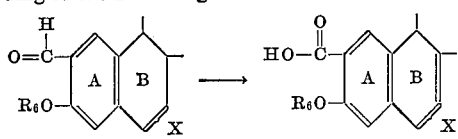

wherein $R_6$ indicates H, acyl, alkyl or aralkyl, by oxidizing with chromosulfuric mixture, pyridine and chromic anhydride, $KMnO_4$ in acetic acid, or with silver ammonium nitrate, the compounds of the following general formula are prepared:

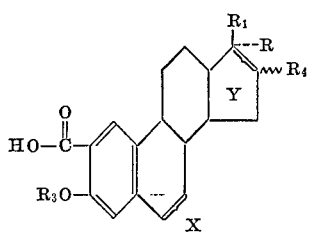

wherein R, $R_1$, $R_3$, $R_4$, X and Y have the same meaning as above.

According to the following scheme:

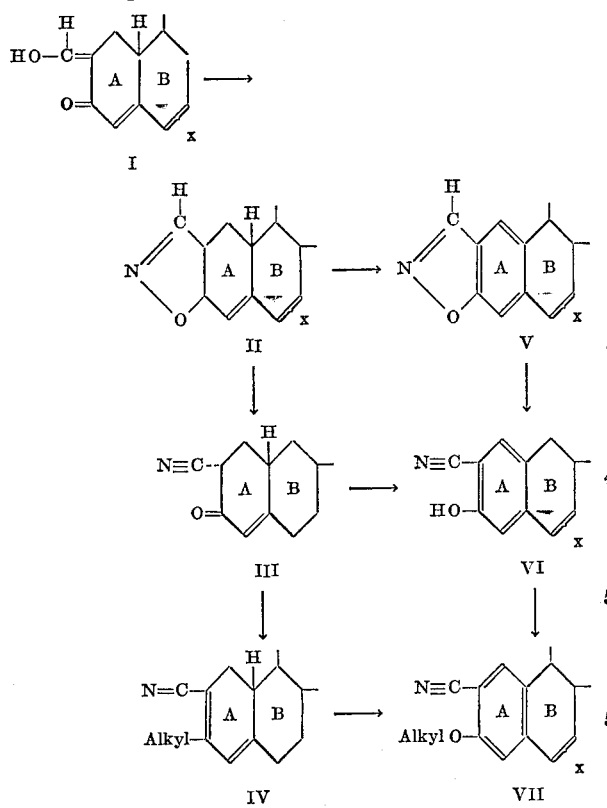

by starting from 2-hydroxymethylene-$\Delta^4$-3-keto-19-nor-steroids (I) and reacting with hydroxylamine hydrochloride, there are obtained the [2,3-d]-isoxazoles of the $\Delta^4$-19-nor-steroids (II), which are reacted at room temperature in dioxane with an alkaline substance, such as sodium methylate, sodium ethylate, or potassium carbonate, to give the 2-$\alpha$-cyano-$\Delta^4$-3-keto-steroids (III), from which, by reacting with diazo-derivatives, such as diazomethane, diazoethane and with alkyl halides in aqueous alcoholic solutions and alkali, and by reacting with the alcohols in the presence of p-toluensulfonic acid in solvents, such as benzene and toluene, the steroidal 2-cyano-3-alkoxy-2,4-dienes (IV) are prepared.

Still according to the above indicated reaction scheme, the 2-cyano-3-ol-1,3,5(10)-triene-steroids (VI) are obtained, starting from 2-$\alpha$-cyano-$\Delta^4$-3-keto-19-nor-steroids (III) and reacting with quinones, such as 2,3-dicyano-5,6-dichlorobenzoquinone in dioxane, in the presence of bases and by refluxing in dioxane in the presence of Pd/C catalyst and hydrogen acceptors, such as methyl or ethyl maleate, cinnamate, or fumarate.

The same 2-cyano-3-ol-1,3,5(10)triene-steroids (VI) can be obtained by starting from the [2,3-d]-isoxazoles of 19-nor-$\Delta^4$-steroids (II). In fact, when these compounds are refluxed in dioxane in the presence of Pd/C catalyst with hydrogen acceptors, such as stilbene, styrene, or ethyl maleate, fumarate, or cinnamate, the 2-cyano-3-ol-1,3,5(10)-trienes (VI) are isolated directly from the reaction mixture.

On the other hand, when the [2,3-d]-isoxazoles (II) are reacted at room temperature with the stoichiometric amount of 2,3-dicyano-5,6-dichloro-benzoquinone, there is obtained the steroidal [2,3-d]-isoxazoles of 1,3,5(10)-trienes (V) which, either by simple boiling with dioxane or by treatment with dilute alkalis, give the steroidal 2-cyano-3-ol-1,3,5(10) trienes (VI).

These compounds (VI), by reacting reaction with alkyl or aralkyl halides or sulfates in alcoholic, or aqueous alcoholic solution, or in benzene or toluene in the presence of bases such as $K_2CO_3$, KOH, NaOH or of $Ag_2CO_3$ lead to steroidal 2-cyano-3-alkoxy- or aralkoxy-1,3,5(10)trienes (VII) which, on the other hand, can be obtained starting from steroidal 2-cyano-3-alkoxy-2,4-dienes by dehydrogenation and aromatization with quinones of the 2,3-dicyano-5,6-dichlorobenzoquinone type in dioxane.

The compounds of the general formula:

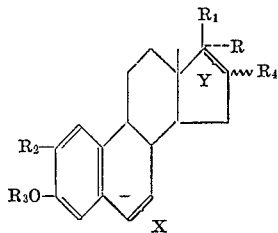

can be utilized as intermediates for the preparation of compounds of this invention according to the following reaction schemes, reduction, from $R_2$=CHO to $$R_2=CH_2OH$$

being effected with $NaBH_4$ or $LiAlH_4$:

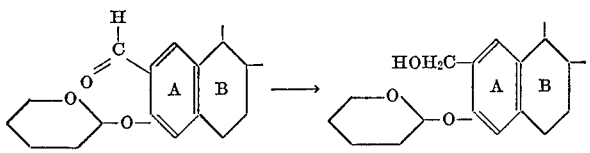

or conversion from $R_2$=CHO to $R_2$=CH=NR and $CH_2$—NHR

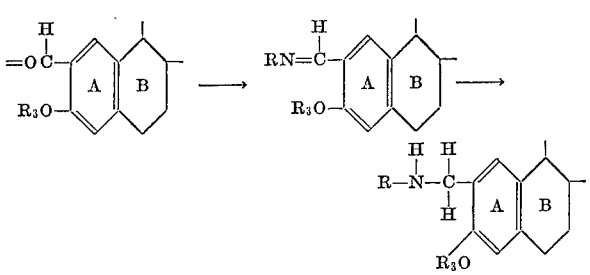

by reaction with ammonia or an aromatic primary, aliphatic, heterocyclic, hetero-aliphatic or arylaliphatic amine followed by reduction with $NaBH_4$ or with $LiAlH_4$.

Also according to the following reaction schemes, if $R_2$ is CN, derivatives are obtained in which $R_2$=$CH_2NH_2$ by reduction with $LiAlH_4$ or in which $R_2$=CHO by reduction with Raney Ni in formic acid at 75—80° C. for 30 minutes.

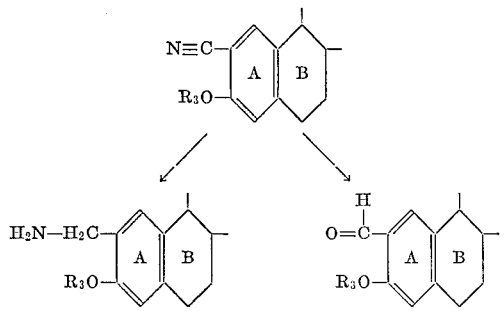

The following examples serve only to illustrate the invention and are not intended to limit it in any way.

EXAMPLE 1

Estra-1,3,5(10)-triene-17β-acetoxy-2-carboxylic acid

To a solution of 5 parts 2-hydroxymethylene-19-nor-testosterone (Brit. Pat. No. 879,100) in 180 parts dioxane, there is added 4 parts 2,3-dichloro-5,6-dicyano-benzoquinone (DDQ) dissolved in 64 parts dioxane. The mixture is left at room temperature for 10 minutes, is diluted with methylene chloride, filtered and evaporated. The residue is dissolved in ethyl ether and the solution is washed with a 5% sodium bicarbonate solution and then with water. Then it is dehydrated and by concentrating the solvent, there are obtained 3.8 parts 2-formyl-estra-1,3,5(10)-triene-3,17β-diol M.P. 232–234° C., $[\alpha]_D = +88°$ (dioxane); $\tau_{max}$ 226.5; 267.5; 337.5 m$\mu$ (lg $\epsilon$4.19–4.16–3.54) EtOH—NaOH $\tau_{max}$ 329, 275, 389 m$\mu$.

3.5 parts of this product is dissolved in 15 parts pyridine and treated with 7.5 parts acetic anhydride. After one night at room temperature, it is thoroughly diluted with water and filtered, and by crystallization from methanol there is obtained 3.9 parts 2-formyl-estra-1,3,5(10)-triene-3,17β-diol-3,17-diacetate; $\tau_{max}$ 261; 295.5 (lg $\epsilon$4.5, 3.66); $[\alpha]_D = +53°$ (CHCl$_3$).

2.5 parts of this compound are dissolved in 100 parts acetone and are treated at 0–10° C. with 10 parts of an 8 N chromic acid solution in water and sulfuric acid. By diluting with water and filtering, there is obtained 1.8 parts estra-1,3,5(10)-triene - 3,17β-diol - 3,17 - diacetate-2-carboxylic acid M.P. 183–185° C.; $[\alpha]_D = +54°$; $\tau_{max}$ 237, 287 (flex) ($\epsilon$7,700; 1.300).

1.5 parts estra-1,3,5(10-triene-3,17β-diol-3,17-diacetate-2-carboxylic acid are dissolved in 2 N sodium hydroxide, resulting in the precipitation of a yellow product, which, after suspension in water and treatment with a solution of monosodium phosphate permits the separation of 1.05 parts estra-1,3,5(10)-triene-3,17β-diol - 17 - acetate - 2-carboxylic acid M.P. 215–217° C.; $\tau_{max}$ 267, 308 m$\mu$.

EXAMPLE 2

2-formyl-estra-1,3,5(10)-triene-3,17β-diol-17 (2'-tetrahydropyranyloxy)

To a solution of 6 parts 19-nor-testosterone in 75 parts dry benzene, there are added 3.6 parts 2,3-dihydropyrane and 0.6 part dry p-toluene-sulfonic acid. After 3 hours at room temperature, the benzene phase is washed with a NaHCO$_3$ solution and then with water to neutrality, and is evaporated to dryness to obtain 6.8 parts 19-nor-testosterone-17β-(2'-tetrahydropyranyloxy) M.P. 83–85° C. from hexane, which is treated with 200 parts benzene, 5.4 parts sodium methylate and 16 parts ethyl formate. After 6 hours at room temperature and in nitrogen atmosphere, under stirring, the mixture is acidified with monosodium phosphate, washed with water and evaporated to dryness to obtain 6.2 parts 2-hydroxymethylene-19-nor-testosterone - 17β - (2' - tetrahydropyranyloxy). After chromatography through a silica gel column, there are obtained from this compound, dissolved in 300 parts benzene with 5.6 parts DDQ added, 2.12 parts 2-formyl-estra-1,3,5(10)-triene-3,17β-diol-17 (2'-tetrahydropyranyloxy) M.P. 118–120° C.

EXAMPLE 3

2-formyl-17α-methyl-estra-1,3,5(10)-triene-3,17β-diol

A solution of 2 parts of 2-hydroxymethylene-17α-methyl-19-nor-testosterone in 50 parts dioxane is treated with 1.8 parts DDQ. After percolation through a silica gel column, there are obtained 1.1 parts 2-formyl-17α-methyl-estra-1,3,5(10)-triene - 3,17β - diol M.P. 185–187° C.; $[\alpha]_D = +65°$. In like manner the following compounds are prepared:

2-formyl-17α-ethyl-estra-1,3,5(10)-triene-3,17β-diol M.P. 156–157° C.
2-formyl-17α-ethnyl-estra-1,3,5(10)-triene-3,17β-diol
2-formyl-17α-vinyl-estra-1,3,5(10)-triene-3,17β-diol M.P. 147–148° C.
2-formyl-19-nor-cholestra-1,3,5(10)-triene-3-ol M.P. 87–89° C.

EXAMPLE 4

2-formyl-17α-methyl-estra-1,3,5(10)-triene-3,17β-diol-3-acetate 1.5 parts 2-formyl-17α-methyl-estra - 1,3,5(10) - triene-3,17β-diol are dissolved in 4 parts pyridine and 2 parts acetic anhydride are added. After one night at room temperature, the reaction mixture is diluted with water and filtered. The thus obtained crude product is crystallized from methanol and there are obtained 1.47 parts 2-formyl-17α-methyl-estra-1,3,5(10)-triene-3,17β-diol - 3 - acetate M.P. 169–170° C.; $[\alpha]_D = +50°$ (chloroform). In like manner the following compounds are prepared:

2-formyl-estra-1,3,5(10)-triene-3,17β-diol-3-acetate-17-(2'-tetrahydropyranyloxy) M.P. 124–126° C.
2-formyl-17α-ethyl-estra-1,3,5(10)-triene-3,17β-diol-3-acetate M.P. 127–129° C.
2-formyl-17α-vinyl-estra-1,3,5(10)-triene-3,17β-diol-3-acetate M.P. 164–166° C.
2-formyl-17α-ethyl-estra-1,3,5(10)-triene-3,17β-diol-3-acetate
2-formyl-19-nor-cholestra-1,3,5(10)-triene-3-ol-3-acetate.

EXAMPLE 5

2-formyl-3-methoxy-17α-methyl-estra-1,3,5(10)-triene-17β-ol 0.47 part 2-formyl-17α-methyl-estra-1,3,5(10)-triene-3,17β-diol are dissolved in 9 parts methanol and 0.7 part potassium hydroxide dissolved in 8.4 parts water are added. The temperature is kept at 30–35° C. and 3.2 parts KOH dissolved in 8.4 parts water and 5 parts dimethyl sulfate are added in over a period of 30 minutes. The mixture is kept at 30–35° C. for 90 minutes, then it is diluted with water, filtered and washed with water to neutrality; after crystallization from acetone there are obtained 0.25 part 2-formyl-3-methoxy-17α-methyl-estra-1,3,5(10)-triene-17β-ol M.P. 198–200° C.; $[\alpha]_D = +75°$; $\tau_{max}$ 225, 266, 334 m$\mu$ ($\epsilon$16,400, 11,600, 4,260).

In like manner the following compounds are prepared:

2-formyl-3-methoxy-estra-1,3,5(10)-triene-17β-ol
M.P. 190–192° C.; $[\alpha]_D = +105°$ (CHCl$_3$)
2-formyl-3-methoxy-19-nor-cholestra-1,3,5(10)-triene; $\tau_{max}$ 224, 266, 334 m$\mu$ ($\epsilon$19,700, 15,000, 1,250).

EXAMPLE 6

2-formyl-3-ethoxy-17α-vinyl-estra-1,3,5(10)-triene-17β-ol

To a benzene solution of 1.63 parts 2-formyl-17α-vinyl-estra-1,3,5(10)-triene-3,17β-diol there are added 2.34 parts ethyl iodide, and the whole is stirred under reflux for 8 hours in the presence of 6 parts silver carbonate. The bottoms are filtered off, and washed with benzene. The united organic phases are extracted with alkali, then they are washed with water to neutrality and evaporated to dryness. By crystallizing from acetone-methanol, there are obtained 1.02 parts 2-formyl-3-ethoxy-17α-vinyl-estra - 1,3,5(10) - triene-17β-ol. In like manner, and by operating as in Example 5 but employing diethyl sulfate as reagent, the following compounds are prepared:

2-formyl-3-ethoxy-estra-1,3,5(10)-triene-17β-ol
2-formyl-3-ethoxy-17α-methyl-estra-1,3,5(10)-triene-17β-ol
2-formyl-3-ethoxy-17α-ethyl-estra-1,3,5(10)-triene-17β-ol
2-formyl-3-ethoxy-19-nor-cholesta-1,3,5(10)-triene
2-formyl-3-ethoxy-17α-ethynyl-estra-1,3,5(10)-triene-17β-ol
2-formyl-3-ethoxy-estra-1,3,5(10)-triene-17-one

EXAMPLE 7

2-formyl-estra-1,3,5(10)-triene-3-ol-17-one

A solution of 5 parts 2-formyl-estradiol in benzene is treated with 0.25 parts p-toluenesulfonic acid and 3 parts ethylene glycol under reflux, the water which forms during the reaction being collected. The reaction mixture is neutralized, the organic phases are washed with water, and evaporated to dryness, to obtain, after crystallization from methanol 4.5 parts 2-formyl-ethylenedioxide-estra-1,3,5(10)-3,17β-diol. This product is dissolved in toluene (110 parts) and cyclohexanone (32 parts) and 30 parts toluene are distilled off to dehydrate the reaction medium. Then there are added over a period of 15 minutes 4 parts aluminum isopropylate dissolved in 45 parts toluene and refluxed for 2 hours. The reaction mixture is cooled, there is added a solution of 14.6 parts Seignette salt in 21 parts water, the organic phases are separated and, after steam distillation, there are obtained 3.71 parts 2-formyl-ethylenedioxide-estra - 1,3,5(10) - triene-3-ol-17-one.

2 parts of this compound, treated in methanol and 2 N sulfuric acid at 45° for half an hour on the water bath, give after dilution with water, filtration and crystallization, 1.25 parts 2-formyl-estra-1,3,5(10)-triene-3-ol-17-one.

EXAMPLE 8

2-cyano-estra-1,3,5(10)-triene-3,17β-diol-17-acetate 15 parts 2-hydroxymethylene-19-nor-testosterone are refluxed for an hour and a half in 300 parts ethanol with 3 parts hydroxylamine hydrochloride in 20 parts water. The mixture is concentrated to ⅓ of its volume, diluted with water and filtered to give 13.8 parts [2,3-d]-isoxazole-estra-4-en-17β-ol, M.P. 179–181° C. This compound is dissolved in 100 parts dioxane and added to 5 parts sodium methylate dissolved in the smallest amount of methanol. There is precipitated the sodium salt of the cyano ketone which is filtered and dissolved in water. The acidified aqueous solution is extracted with sulfuric ether. The ethereal extracts, after washing with water to neutrality, are dried on sodium sulfate, and concentrated. There separates 9.8 parts 2α-cyano-19-nor-testosterone (M.P. 163–165° C.) which is dissolved in 98 parts pyridine and 49 parts acetic anhydride and kept overnight at room temperature. After dilution with water, there are obtained 12.2 parts 2-cyano-19-nor-androsta-2,4-diene-3,17-diacetoxy, M.P. 175–177° C., which are treated, after suspension in methanol, with a 1% potash methanolic solution at 15° C. After 5 minutes (beginning from the moment when the whole product has been dissolved), the reaction mixture is acidified with 15% acetic acid, thoroughly diluted with water and filtered to obtain 10.2 parts 2α-cyano-19-nor-testosterone-17-acetate, M.P. 157–159° C.

1.8 parts 2α-cyano-estra-4-en-3-one-17β-ol-17-acetate dissolved in 50 parts dioxane are added to 1 part n-tributylamine and then 1.2 parts DDQ in 30 parts dioxane. The separated hydroquinone is filtered out, the filtrate is diluted with methylene chloride and is percolated through a silica gel column. After crystallization from methanol, there are obtained 1.22 parts 2-cyano-estra-1,3,5(10)-triene-3,17β-diol-17-acetate, M.P. 260–262° C.

EXAMPLE 9

2-cyano-estra-1,3,5(10)-triene-3-ol-17-one 1 part [2,3-d]-isoxazole-estra-4-en-17β-ol dissolved in 50 parts of dioxane is refluxed for 24 hours with 1.3 parts diethyl maleate and 2 parts 10% Pd/C. The reaction mixture is filtered, and evaporated to dryness. The crude product is purified with hexane, and successively crystallized from methanol to give 0.81 parts 2-cyano-estra - 1,3,5(10) - triene-3,17β-diol, M.P. 336–338° C.; $[\alpha]_D = +41°$; $\tau_{max}$ 236, 305 mμ.

0.5 part 2-cyano-estra-1,3,5(10)-triene-3,17β-diol as obtained above are dissolved in 5 parts pyridine and added to a suspension of 0.5 parts chromic anhydride in 5 parts pyridine. The reaction mixture is kept overnight at room temperature, and then the precipitated product is filtered out. By crystallizing the latter from acetone, there are obtained 0.36 parts 2-cyano-estra-1,3,5(10)-triene-3-ol-17-one.

EXAMPLE 10

2-cyano-17α-ethyl-estra-1,3,5(10)-triene-3,17β-diol

.04 part 2-α-cyano-17α-ethyl-19-nor-testosterone, M.P. 180–182° C. obtained from 2-hydroxymethylene-17α-ethyl-19-nor-testosterone by reaction with hydroxylamine hydrochloride to give the [2,3-d]-isoxazole (following the method indicated in Example 8 and subsequent alkaline splitting of the isoxazole in dioxane with methanol-sodium methylate) is dissolved in 25 parts dioxane and refluxed with 0.6 part diethyl maleate in the presence of 0.5 g. 10% Pd/C. After 24 hours, the reaction mixture is cooled, and the catalyst is filtered off. The dioxane solution is evaporated. The solid which remains is leached with hexane and the residue is crystallized from methanol to obtain 2-cyano-17α-ethyl-estra-1,3,5(10)-triene-3,17β-diol.

EXAMPLE 11

2-cyano-estra-1,3,5(10)-3,17β-diol-3,17-diacetate

To a solution of 3.4 parts [2,3-d]-isoxazole-estra-4-en-17-acetate (M.P. 138–139° C.; $\tau_{max}$ 285 mμ; ε10,400) obtained by acylation of the corresponding [2,3-d]-isoxazole-17β-ol (see Example 8) in 50 parts dioxane, there are added 2.5 parts 2,3 - dichloro-5,6-dicyano-benzoquinone dissolved in 50 parts dioxane. After four days, the precipitated hydroquinone is filtered, the filtrate is diluted with 500 parts methylene chloride and is percolated through a silica gel column, to obtain 2.61 parts [2,3-d]-isoxazole - estra - 1,3,5(10) - triene-17β-ol-17-acetate (M.P. 145–147° C.; $\tau_{max}$ 246, 253, 288, mμ; lg ε3.74–3, 72–4.00).

A solution of 1 part of this compound in 10 parts dioxane was refluxed for 12 hours, and then evaporated to dryness to obtain 0.91 part 2-cyano-estra-1,3,5(10)-triene-3,17β-diol-17 - acetate, which by a subsequent treatment with pyridine acetic anhydride at room temperature overnight gave 1.05 parts 2-cyano-estra-1,3,5(10)-triene-3,17-diacetate, M.P. 149–150° C.; $[\alpha]_D = +45°$.

The same compound can be obtained from the same [2,3-d]-isoxazole-estra-1,3,5(10)-triene-17-acetate by refluxing a solution of 1.2 parts in 20 parts methanol 1% $K_2CO_3$ solution, for 1 hour, concentrating, acidifying and diluting with water. After filtration, the crude product is acetylated to give 1.10 parts 2 - cyano-estra-1,3,5(10)-triene-3,17-diacetate. By operating as in Example 11, starting from the corresponding [2,3-d]-isoxazole of a 19-nor- Δ⁴-steroid, the following [2,3 - d] - isoazazoles were prepared:

[2,3-d]-isoxazole-estra-1,3,5(10)-triene-17β-ol, M.P. 178–180° C.
[2,3-d]-isoxazole-17α-methyl-estra-1,3,5(10)-triene-17β-ol
[2,3-d]-isoxazole-17α-vinyl-estra-1,3,5(10)-triene-17β-ol
[2,3-d]-isoxazole-17α-ethyl-estra-1,3,5(10)-triene-17β-ol
[2,3-d]-isoxazole-estra-1,3,5(10)-triene-17-one
[2,3-d]-isoxazole-19-nor-cholesta-1,3,5(10)-triene.

By operating as in Examples 8, 9, 10, and 11, starting from 2α-cyano - 19-nor-Δ⁴-3-ketosteroids, from [2,3-d]-isoxazole-Δ⁴-10-nor-steroids or from [2,3-d]-isoxazole-19-nor-1,3,5(10)-trienes, the following compounds have been prepared:

2-cyano-19-nor-cholesta-1,3,5(10)-triene-3-ol
2-cyano-19-nor-cholesta-1,3,5(10)-triene-3-acetoxy
2-cyano-17α-methyl-estra-1,3,5(10)-triene-3,17β-diol
2-cyano-17α-methyl-estra-1,3,5(10)-triene-3,17β-diol-3-acetate
2-cyano-17α-methyl-estra-1,3,5(10)-triene-3,17β-diol-3,17-diacetate
2-cyano-17α-ethynyl-estra-1,3,5(10)-triene-3,17β-diol
2-cyano-17α-ethynyl-estra-1,3,5(10)-triene-3,17β-diol-3-acetate
2-cyano-17α-ethynyl-estra-1,3,5(10)-triene-3,17β-diol-3,17-diacetate
2-cyano-17α-ethyl-estra-1,3,5(10)-triene-3,17β-diol-3-acetate
2-cyano-17α-ethyl-estra-1,3,5(10)-triene-3,17β-diol-3,17-diacetate
2-cyano-17α-vinyl-estra-1,3,5(10)-triene-3,17β-diol
2-cyano-17α-vinyl-estra-1,3,5(10)-triene-3,17β-diol-3-acetate
2-cyano-17α-vinyl-estra-1,3,5(10)-triene-3,17β-diol-3,17-diacetate
2-cyano-17α-propyl-estra-1,3,5(10)-triene-3,17β-diol.

EXAMPLE 12

2-cyano-3-methoxy-estra-1,3,5(10)-triene-17β-ol-17-acetate

To a suspension of 0.5 part of 2α-cyano-19-nor-testosterone in 10 parts methanol, there are added 10 parts of a diazomethane ethereal solution. The whole product dissolves. The solution is evaporated to dryness, benzene is added, it is extracted with Claisen alkali, washed with water to neutrality and the benzene solution is evaporated to dryness. By crystallizing from methanol, there are obtained 0.35 part 2 - cyano-3-methoxy-estra-2,4-diene-17β-ol, M.P. 199–201° C.; $[\alpha]_D = -40°$.

0.2 part of this product, dissolved in 12 parts dioxane, are treated at room temperature with 0.16 part 2,3-dichloro-5,6 - dicyano-benzoquinone dissolved in 2.8 parts dioxane. The precipitated hydroquinone is filtered off and the filtrate is diluted with 100 parts $CH_2Cl_2$. By evaporating the dioxane-methylene chloride solvent, there are obtained 0.14 part 2-cyano-3-methoxy-estra-1,3,5(10)-triene-17β-ol, M.P. 198–199° C.

This compound is treated with 2 parts pyridine and 1 part acetic acid anhydride overnight at room temperature, and then it is diluted with water and crystallized from methanol to give 0.095 part 2-cyano-3-methoxy-estra - 1,3,5(10) - triene-17β-ol-17-acetate, M.P. 219–221° C.

EXAMPLE 13

2-cyano-3-methoxy-17α-vinyl-estra-1,3,5(10)-triene-17β-ol

By operating under the same conditions indicated in Example 5 but starting from 0.47 parts 2-cyano-17α-vinyl-estra-1,3,5(10)-triene - 3,17β-diol, there were obtained 0.19 parts 2-cyano - 3-methoxy-17α-vinyl-estra-1,3,5(10)triene-17β-ol.

EXAMPLE 14

2-cyano-3-n-butoxy-estra-1,3,5(10)-triene-17-one

To a solution of 5 parts 2α-cyano-19-nor-testosterone in 50 parts benzene are added 0.25 parts p-toluene-sulfonic acid and 5 parts n-butanol. The reaction medium is refluxed for 8 hours while collecting the water formed during the reaction by means of a Marcusson device. Then the reaction medium is neutralized with pyridine, cooled, the benzene phase is washed with alkali, with water and evaporated to dryness; by crystallization from methanol there are obtained 5.1 parts 2-cyano-3-n-butoxy-estra-2,4-diene-17β-ol. 3.55 parts of this compound are refluxed for 24 hours with 3 parts 10% Pd/C and 1.9 parts ethyl maleate. The catalyst is filtered off, the filtrate is evaporated to dryness and chromatographed through alumina. From the petroleum ether-benzene 20:80 fraction, there are obtained 2.65 parts 2-cyano-3-n-butoxy-estra-1,3,5(10)-triene-17β-ol.

2 parts of this compound, dissolved in acetone, are oxidized at 5–10° C. with 4 ml. Jones' reagent. By dilution with water, filtration and crystallization from methanol, there are obtained 1.05 parts 2-cyano-3-n-butoxy-estra-1,3,5(10)-triene-17-one; $\tau_{max}$ 235, 308 mμ.

By operating as in Examples 12, 13 and 14, that is, either by aromatization of steroidal 2-cyano-3-alkoxy-19-nor-2,3-dienes, for example, with Pd/C and ethyl maleate, or with DDQ in benzene, or by esterification of 2-cyano-3-ol-estratrienes, the following compounds are prepared:

2-cyano-3-methoxy-17α-ethynyl-estra-1,3,5(10)-triene-17β-ol
2-cyano-3-methoxy-17α-methyl-estra-1,3,5(10)-triene-17β-ol
2-cyano-3-n-butoxy-17α-ethynyl-estra-1,3,5(10)-triene-17β-ol
2-cyano-3-n-butoxy-17α-vinyl-estra-1,3,5(10)-triene-17β-ol
2-cyano-3-n-butoxy-17α-ethyl-estra-1,3,5(10)-triene-17β-ol
2-cyano-3-ethoxy-17α-ethyl-estra-1,3,5(10)-triene-17β-ol
2-cyano-3-methoxy-17α-propyl-estra-1,3,5(10)-triene-17β-ol

EXAMPLE 15

2-cyano-3-(2'-tetrahydropyranyloxy)-estra-1,3,5(10)-triene-17β-ol

To a solution of 3 parts 2-cyano-estra-1,3,5(10)-triene-3,17β-diol-17-acetate in 150 parts dry benzene there are added 2.5 parts 2,3-dihydropyrane and a solution of 2 parts p-toluene-sulfonic acid in 10 parts benzene. After 4 hours at room temperature, the solution is neutralized with pyridine. The benzene solution is washed with water, alkali and water, and is evaporated to dryness. By crystallization there are obtained 2.65 parts 2-cyano-3-(2'-tetrahydropyranyloxy)-estra - 1,3,5(10)-triene-17β-ol-17-acetate, M.P. 154–160° C. 1.5 parts of this compound are refluxed for 1 hour with 25 parts of a 2.5% $K_2CO_3$ solution. After concentration, dilution with water and filtration there are obtained 1.12 parts 2-cyano-3-(2'-tetrahydropyranyloxy)-estra-1,3,5(10)-triene-17β-ol.

The same product can be obtained starting from 2-cyano-estra-1,3,5(10)-triene-3-ol-17-one by suspending 2 parts of this compound in 20 parts 2,3-dihydropyrane and adding the suspension at 0° C. to 0.2 part $POCl_3$. The mixture is heated sufficiently to effect the complete dissolution of the steroid, then it is left overnight at room temperature. Then it is diluted with ether, washed with alkali and water to neutrality, and evaporated to dryness. By crystallization from hexane-ethyl ether there are obtained 2.15 parts 2-cyano-3-(2'-tetrahydropyranyloxy)-estra-1,3,5(10)-triene-17-one.

To 0.25 parts of this compound, dissolved in 5 parts dioxane and 5 parts methanol, there are added 0.25 parts sodium borohydride. After 1 hour at room temperature, the reaction mixture is diluted with a monosodium phosphate solution. The precipitated product is filtered and crystallized from aqueous methanol to give 0.21 parts 2-cyano - 3(2'-tetrahydropyranyloxy)-estra-1,3,5(10)-triene-17$\beta$-ol.

EXAMPLE 16

2-cyano-3-(2'-tetrahydropyranyloxy)-17$\alpha$-ethyl-estra-1,3,5(10)-triene-17$\beta$-ol A solution of 2 parts 2-cyano-3-(2'-tetrahydropyranyloxy)-estra-1,3,5(10)-triene - 17-one in 70 parts toluene and 30 parts ethyl ether is de-aerated at 0° C. with nitrogen, saturated with acetylene and, still in a current of acetylene, there are added 10 parts of a solution containing 4 equivalents of potassium tert-butylate in tert-butanol. The bubbling of acetylene is continued for 6 hours and then the reaction mixture is left at 0° C. for 4 days. The precipitate formed is filtered, suspended in ammonium chloride solution and extracted with ethyl acetate. The organic phase, washed with water to neutrality, and evaporated to dryness, gave, by crystallization from methanol, 1.57 parts 2-cyano - 3-(2'-tetrahydropyranyloxy)-17$\alpha$-ethynyl-estra-1,3,5(10)-triene-17$\beta$-ol.

The hydrogenation of 0.25 parts of the preceding compound in pyridine with 2% Pd/CaCO$_3$ leads to the 17$\alpha$-vinyl derivative. When a solution of 1.1 parts of the same compound, 2-cyano - 3-(2'-tetrahydropyranyloxy)-17$\alpha$-ethynyl-estra-1,3,5(10)-triene-17$\beta$-ol, in 40 parts ethanol is in the presence of 1 part 5% Pd/CaCO$_3$ up to the absorption of the equivalent of 2 moles H$_2$, after filtration of the catalyst, concentration to a small volume and dilution with water, there are obtained 0.96 parts 2-cyano - 3-(2'-tetrahydropyranyloxy) - 17$\alpha$-ethyl-estra-1,3,5(10)-triene-17$\beta$-ol.

EXAMPLE 17

2-hydroxymethyl-3-(2'-tetrahydropyranyloxy)-19-nor-cholesta-1,3,5(10)-triene

To a solution of 1.5 parts 2-formyl-19-nor-cholesta-1,3,5(10)-triene-3-ol in benzene, there is added 1 part of 2,3-dihydropyrane and 0.1 part of dry-p-toluensulfonic acid. The mixture is kept for 4 hours at room temperature. Then it is neutralized with sodium methylate, the benzene phase is washed with water and evaporated to dryness to obtain, after crystallization from methanol, 1.54 parts 2-formyl-3(2' - tetrahydropyranyloxy)-19-nor-cholesta-1,3,5(10)-triene.

To 1 part of this product, dissolved in dioxane-methanol, is added 0.4 part sodium borohydride. The mixture is kept at room temperature for 3 hours; then it is diluted with a monosodium phosphate solution, and the crystalline precipitate formed is filtered. This is re-crystallized from methanol to give 0.65 part 2-hydroxymethyl-3-(2'-tetrahydropyranyloxy) - 19 - nor - cholesta-1,3,5(10)-triene; $\tau_{max}$ 278, 285 m$\mu$ ($\epsilon$1950, 1825).

EXAMPLE 18

2-hydroxymethyl-3-(2'-tetrahydropyranyloxy)-estra-1,3,5(10)-triene-17$\beta$-ol

Starting from 2-hydroxymethylene-19-nor-testosterone-17-acetate (4 parts) and operating as in Example 3 by dehydrogenation with DDQ, there is obtained 2-formyl-estra-1,3,5(10)-triene - 3,17$\beta$ - diol-17-acetate (3.1 parts) M.P. 169–171° C.

3 parts of this compound are dissolved in benzene and 1.2 parts 2,3-dihydropyrane and 0.12 part p-toluene-sulfonic acid are added. The mixture is left at room temperature for 4 hours, neutralized with a solution of sodium ethylate, and the benzene solution is extracted with alkali. The extract is evaporated to dryness, and by crystallization from methanol, there are obtained 2.8 parts 2-formyl - 3(2' - tetrahydropyranyloxy) - estra-1,3,5(10)-triene-17$\beta$-ol-17-acetate. From this compound (2.5 parts), by reduction with NaBH$_4$ (1.2 parts) in dioxane-methanol (as in the preceding example but under reflux) there are obtained 1.92 parts 2-hydroxymethyl-3-(2'-tetrahydropyranyloxy)-estra-1,3,5(10)-triene-17$\beta$-ol.

EXAMPLE 19

2-aminomethyl-3-methoxy-estra-1,3,5(10)-triene-17$\beta$-ol

A solution of 1 part 2-cyano-3-methoxy-estra-1,3,5(10)-triene-17$\beta$-ol in 30 parts tetrahydrofurane is refluxed under stirring with 1 part LiAlH$_4$ for 8 hours. The excess LiAlH$_4$ is destroyed with ethyl acetate and water, the reaction mixture is diluted with ether and is filtered. The organic phase is evaporated to dryness. The residue is crystallized from methanol to give 0.65 part 2-aminomethyl-3-methoxy - estra - 1,3,5(10) - triene - 17$\beta$-ol. By operating as in this example, the following compounds are obtained:

2-aminomethyl-3-ethoxy-estra-1,3,5(10)-triene-17$\beta$-ol
2-aminomethyl-3-ethoxy-estra-1,3,5(10)-triene-17$\beta$-ol-3-(2'-tetrahydropyranyloxy)
2-aminomethyl-estra-1,3,5(10)-triene-3,17$\beta$-diol
2-aminomethyl-17$\alpha$-methyl-estra-1,3,5(10)-triene-3,17$\beta$-diol
2-aminomethyl-17$\alpha$-ethynyl-estra-1,3,5(10)-triene-3,17$\beta$-diol.

EXAMPLE 20

2-(N-cyclohexylaminomethyl)-estra-1,3,5(10)-triene-3-methoxy-17$\beta$-ol

A solution of 0.63 part 2-formyl-3-methoxy-estra-1,3,5(10)-triene-17$\beta$-ol in 30 parts benzene is refluxed with 0.32 part cyclohexylamine while collecting the water formed during the reaction. The solution is evaporated to dryness and a crystallization is effected from ethyl ether-hexane to obtain 0.54 part (3'-methoxy-estra-1',3',5'(10)'-triene - 17$\beta$ - ol - 2 - formylidene)cyclohexyl-1-amine. 0.4 part of this compound, dissolved in dioxane-methanol, is refluxed with 0.21 part NaBH$_4$. Then the reaction mixture is neutralized, concentrated, diluted with water and extracted with ethyl ether. From the organic phase, after the usual washing operations and dehydration on Na$_2$SO$_4$, by evaporating the solvent and percolating through an alumina column, there are obtained 0.23 part 2-(N-cyclohexylaminomethyl)-estra-1,3,5(10)-triene - 3 - methoxy-17$\beta$-ol.

By operating as in this example, the following compounds are obtained:

2-(N-pentylaminomethyl)-3-methoxy-estra-1,3,5(10)-triene-17$\beta$-ol
2-(N-pentylaminomethyl)-17$\alpha$-vinyl-estra-1,3,5(10)-triene-17$\beta$-ol
2-(N-pentylaminomethyl)-19-nor-cholesta-1,3,5(10)-triene
2-(N-butylaminomethyl)-estra-1,3,5(10)-triene-3,17$\beta$-diol

EXAMPLE 21

2-formyl-3-butoxy-19-nor-cholesta-1,3,5(10)-triene 7.5 parts of Raney Ni alloy (50/50) are stirred for 40 minutes with 150 parts 2 N NaOH. The temperature is allowed to rise and thereafter the alkaline solution is decanted and the nickel washed twice with water.

A solution of 2-cyano-3-n-butoxy-19-nor-cholesta-1,3,5(10)-triene (5 parts) in 75 parts formic acid is added to the moist catalyst and the mixture is stirred at 75–80° C. for 30 minutes. The mixture is filtered, diluted with water, and extracted with ether. The extracts, washed with a dilute NaHCO$_3$ solution, are evaporated to give 3.6 parts crude 2-formyl-3-n-butoxy-19-nor-cholesta-1,3,5(10)-triene.

What is claimed is:
1. A compound of the formula:

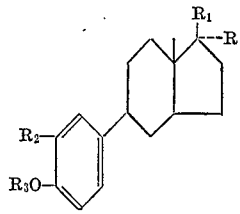

wherein R is a member selected from the group consisting of hydrogen, lower alkyl, vinyl, and ethynyl; $R_1$ is a member selected from the group consisting of hydroxy, 2'-tetrahydropyranyloxy, acetoxy, and $C_8H_{17}$; or R and $R_1$ taken together comprise keto; $R_2$ is a member selected from the group consisting of formyl, nitrile, carboxy, hydroxymethyl, —$CH_2NH_2$, —$CH_2$—NH—$R_b$, —CH=N—$R_b$, where $R_b$ is lower alkyl or cyclohexyl; and $R_3$ is a member selected from the group consisting of hydrogen, lower alkyl, acetyl and 2'-tetrahydropyranyl.

2. A compound of the formula:

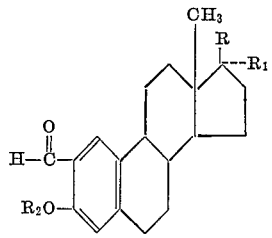

wherein R is selected from the group consisting of hydroxy and acyloxy derived from a lower organic carboxylic acid; $R_1$ is selected from the group consisting of hydrogen, lower alkyl and —C≡CH; $R_2$ is selected from the group consisting of hydrogen, lower alkyl and acyl derived from a lower organic carboxylic acid; and R and $R_1$ when taken together are keto.

3. A method for preparing a 2-formyl-3-hydroxy-steroid of the 19-nor-cholesta-1,3,5(10)-triene and estra-1,3,5(10)-triene series, comprising reacting a member selected from the group consisting of a 2-hydroxymethylene-3-keto-19-norcholesta-4-ene and a 2-hydroxymethylene-3-keto-estra-4-ene and tautomeric forms thereof with a quinone dehydrogenating agent in a solvent selected from the group consisting of dioxane, benzene and acetone.

4. A method for preparing a 2-cyano-3-hydroxy-steroid 19 - nor - cholesta - 1,3,5(10) - triene and estra - 1,3,5 (10)-triene series, comprising reacting a member selected from the group consisting of a 19-nor-cholesta-4-ene-[2,3-d]-isoxazole and an estra-4-ene-[2,3-d]isoxazole with a hydrogen acceptor selected from the group consisting of methyl maleate, ethyl maleate, methyl cinnamate, ethyl cinnamate, stilbene and styrene in dioxane in the presence of Pd/C as a hydrogen transfer agent.

5. A method for preparing a 2-cyano-3-hydroxy-steroid of the 19-nor-cholesta-1,3,5(10)-triene and estra-1,3,5(10)-triene series, comprising reacting a member selected from the group consisting of a 2α-cyano-3-keto-19-nor-cholesta-4-ene and a 2α-cyano-3-keto-estra-4-ene with a hydrogen acceptor selected from the group consisting of methyl maleate, ethyl maleate, methyl cinnamate, ethyl cinnamate, stilbene and styrene in dioxane in the presence of Pd/C as a hydrogen transfer agent.

6. A method for preparing a 2-cyano-3-hydroxy-steroid of the 19-nor-cholesta-1,3,5(10)-triene and estra-1,3,5(10)-triene series, comprising reacting a member selected from the group consisting of a 2α-cyano-3-keto-19-nor-cholesta-4-ene and a 2α - cyano-3-keto-estra-4-ene with a quinone selected from the group consisting of chloranyl and 2,3-dicyano-5,6-dichlorobenzoquinone in dioxane in the presence of a tertiary amine selected from the group consisting of trimethylamine and tributylamine.

7. A process for the preparation of a compound of the formula:

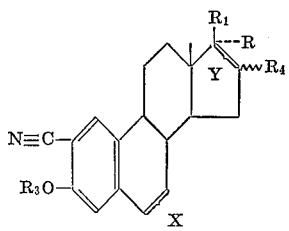

wherein R is a member selected from the group consisting of hydrogen, lower alkyl, —CH=CH—$R_a$, —C≡C—$R_a$, hydroxy, 2'-tetrahydropyranyloxy and acyloxy in which the acyl radical is derived from a carboxylic acid having 2 to 10 carbon atoms; $R_1$ is a member selected from the group consisting of hydrogen, hydroxy, 2' - tetrahydropyranyloxy, lower alkoxy, acyloxy in which the acyl radical is derived from a carboxylic acid having 2 to 10 carbon atoms and $C_8H_{17}$; $R_3$ is lower alkyl; $R_4$ is a member selected from the group consisting of H, Cl, Br, I, methyl, allyl, propyl, ethyl and hydroxy; and X and Y are each selected from the group consisting of a single and a double bond, $R_a$ being a member selected from the group consisting of hydrogen and lower alkyl, comprising reacting with a dehydrogenating agent selected from the group consisting of chloranyl and 2,3-dicyano-5,6-dichlorobenzoquinone in a solvent selected from the group consisting of dioxane, benzene and acetone, a compound of the formula:

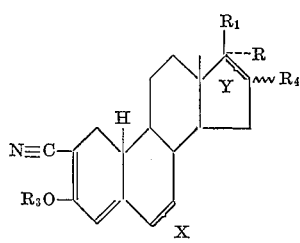

wherein R, $R_1$, $R_3$, $R_4$, X and Y have the same meaning as above.

8. A process for the preparation of a compound of the formula:

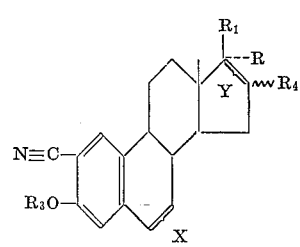

wherein R is a member selected from the group consisting of hydrogen, lower alkyl, —CH=CH—$R_a$,

hydroxy, 2'-tetrahydropyranyloxy and acyloxy in which the acyl radical is derived from a carboxylic acid having 2 to 10 carbon atoms; $R_1$ is a member selected from the group consisting of hydrogen, hydroxy, 2'-tetrahydropyranyloxy, lower alkoxy, acyloxy in which the acyl radical is derived from a carboxylic acid having 2 to 10 carbon atoms and $C_8H_{17}$; $R_3$ is lower alkyl; $R_4$ is a member selected from the group consisting of H, Cl, Br, L, methyl, allyl, propyl, ethyl and hydroxy; and X and Y are each selected from the group consisting of a single and a double bond, $R_a$ being a member selected from the group consisting of hydrogen and lower alkyl, comprising reacting a hydrogen acceptor selected from the group consisting of ethyl maleate, methyl maleate, ethyl cinnamate and styrene in dioxane in the presence of Pd/C as a hydrogen transfer agent with a compound of the formula

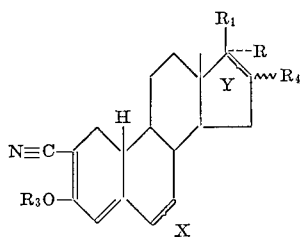

wherein R, $R_1$, $R_3$, $R_4$, X and Y have the same meaning as above.

9. A process for the preparation of an ether of a 2-formyl- or 2-cyano-3-hydroxy steroid of the 19-nor-cholesta-1,3,5(10)-triene and estra-1,3,5(10)-triene series, comprising reacting a compound selected from the group consisting of a 2-cyano-3-hydroxy-19-nor-cholesta-1,3,5 (10) - triene, a 2-formyl-3-hydroxy-19-nor-cholesta-1,3,5 (10) - triene, a 2-cyano-3-hydroxy-estra-1,3,5(10) - triene and a 2-formyl-3-hydroxy-estra-1,3,5(10) - triene with a compound selected from the group consisting of a lower alkyl halide, a lower alkyl sulfate, and an aralkyl halide in a solvent selected from the group consisting of methanol, ethanol, water, benzene, toluene and mixtures thereof in the presence of a member selected from the group consisting of $Ag_2CO_3$, $K_2CO_3$, KOH and NaOH.

10. A process for the preparation of a 3-(2′-tetrahydropyranyl)-ether of a 2-cyano- or 2-formyl-3-hydroxy-steroid of the 19-nor-cholesta-1,3,5(10)-triene and estra-1,3,5(10)-triene series, comprising reacting a compound selected from the group consisting of a 2-cyano-3-hydroxy-19-nor-cholesta-1,3,5(10)-triene, a 2-formyl-3-hydroxy-19-nor-cholesta - 1,3,5(10) - triene, a 2-cyano-3-hydroxy-estra-1,3,5(10)-triene and a 2-formyl-3-hydroxy-estra-1,3,5(10)-triene with 2,3-dihydropyrane in the presence of an acid catalyst selected from the group consisting of $POCl_3$, p-toluenesulfonic acid and hydrogen chloride in a solvent selected from the group consisting of 2,3-dihydropyrane, tetrahydrofurane, benzene and dioxane.

11. A process for the preparation of a 2-cyano-3-(2′-tetrahydropyranyloxy) - 17α - vinyl - estra - 1,3,5(10) - triene-17β-ol, comprising reacting 2 - cyano - 3 - (2′-tetrahydropyranyloxy)-estra-1,3,5(10)-triene-17-one with acetylene in the presence of potassium t-butylate in a solvent selected from the group consisting of toluene, sulfuric ether, t-butanol and mixtures thereof and hydrogenating up to the absorbtion of the equivalent of one mole of hydrogen, the resulting 17α-ethynyl-2-cyano-3-(2′-tetrahydropyranyloxy)-estra-1,3,5(10)-triene-17β-ol in a solvent selected from the group consisting of dioxane and pyridine and mixtures thereof in the presence of a catalyst selected from the group consisting of 2% $Pd/CaCO_3$ and 5% $Pd/CaCO_3$.

12. A process for the preparation of 2-cyano-3-(2′-tetrahydropyranyloxy) - 17α - ethyl - estra - 1,3,5(10) - triene-17β-ol, comprising reacting 2-cyano-3-(2′-tetrahydropyranyloxy)-estra-1,3,5(10)-triene-17-one with acetylene in the presence of potassium t-butylate, in a solvent selected from the group consisting of toluene, sulfuric ether, tert-butanol and mixtures thereof, and hydrogenating up to the absorption of two moles of hydrogen, the resulting 17α - ethynyl - 2 - cyano - 3 - (2′ - tetrahydropyranyloxy)-estra-1,3,5(10) - triene - 17β - ol in a solvent selected in the group consisting of dioxane, ethanol and ethyl acetate in the presence of 5% $Pd/CaCO_3$ as a catalyst.

13. A method for the preparation of a compound of the formula:

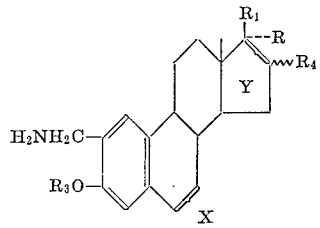

wherein R is a member selected from the group consisting of hydrogen, lower alkyl, —CH=CH—$R_a$, —C≡C—$R_a$, hydroxy and 2′-tetrahydropyranyloxy; $R_1$ is a member selected in the group consisting of hydrogen, hydroxy, 2′-tetrahydropyranyloxy, lower alkoxy and $C_8H_{17}$, or R and $R_1$ together comprise ethylendioxy; $R_3$ is a member selected from the group consisting of hydrogen, 2′-tetrahydropyranyl, lower alkyl and $C_6H_5$—$CH_2$; $R_4$ is a member selected from the group consisting of methyl and hydroxyl; and X and Y are each selected from the group consisting of a single and a double bond, $R_a$ being a member selected from the group consisting of hydrogen and lower alkyl, comprising reacting with lithium aluminum hydride in a solvent selected from the group consisting of tetrahydrofurane, benzene and ethyl ether, a compound of the formula:

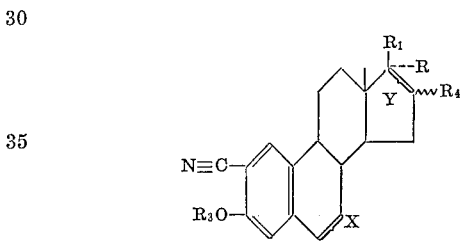

wherein R, $R_1$, $R_3$, $R_4$, X and Y have the same meaning as above.

14. A process for the preparation of a compound of the formula:

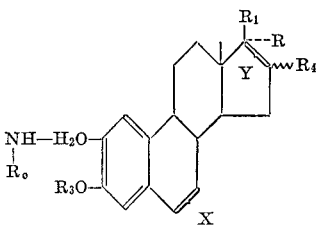

wherein $R_c$ is a member selected from the group consisting of lower alkyl, aryl and aralkyl; R is a member selected in the group consisting of hydrogen, lower alkyl, —CH=CH—$R_a$, —C≡C—$R_a$ hydroxy and 2′-tetrahydropyranyloxy; $R_1$ is a member selected from the group consisting of hydrogen, hydroxy, 2′-tetrahydropyranyloxy, lower alkoxy and $C_8H_{17}$; or R and $R_1$ together comprise ethylendioxy; $R_3$ is a member selected from the group consisting of hydrogen, 2′-tetrahydropyranyl, lower alkyl and $C_6H_5$—$CH_2$; $R_4$ is a member selected from the group consisting of methyl and hydroxyl and X and Y are each selected from the group consisting of a single and a double bond, $R_a$ being a member selected from the group consisting of hydrogen and lower alkyl, comprising reacting with sodium borohydride in a solvent selected from the group consisting of dioxane, methanol, water and mixtures thereof, or with lithium aluminum hydride in a solvent selected from the group consisting of ethyl ether, benzene and tetrahydrofurane, a compound of the formula:

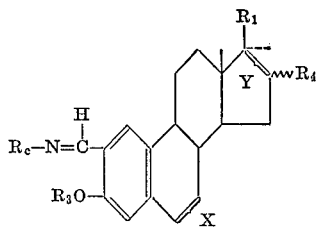

wherein $R_c$, $R$, $R_1$, $R_3$, $R_4$, X and Y have the same meaning as above.

15. A process for the preparation of a compound of the formula:

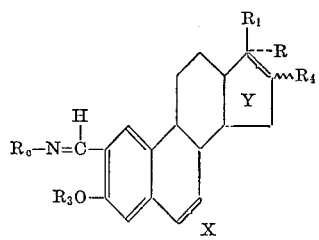

wherein $R_c$ is a member selected from the group consisting of lower alkyl, aryl and aralkyl; R is a member selected from the group consisting of hydrogen, lower alkyl, —C=CH—$R_a$, —C≡C—$R_a$, hydroxy and 2'-tetrahydropyranyloxy; $R_1$ is a member selected from the group consisting of hydrogen, hydroxy, 2'-tetrahydropyranyloxy, lower alkoxy and $C_8H_{17}$; or R and $R_1$ together comprise ethylendioxy; $R_3$ is a member selected from the group consisting of hydrogen, 2'-tetrahydropyranyl, lower alkyl and $C_6H_5$—$CH_2$; $R_4$ is a member selected from the group consisting of methyl and hydroxyl; and X and Y are each selected from the group consisting of a single and a double bond, $R_a$ being selected from the group consisting of hydrogen and lower alkyl, comprising reacting with a member selected from the group consisting of ammonia, a primary aliphatic amine having 2 to 7 carbon atoms, $C_6H_5$—$CH_2CH_2$—$NH_2$ aniline, cycohexylamine, $C_6H_5(CH_2)_3$—$NH_2$ and

$C_6H_5$—$CH_2$—$\overset{CH_3}{\underset{|}{C}HNH_2}$ a compound of the formula:

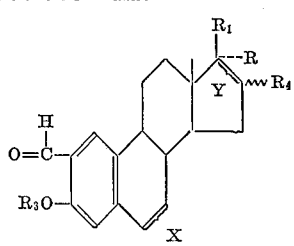

wherein R, $R_1$, $R_3$, $R_4$, X and Y have the same meaning as above.

16. A process for the preparation of a 2-hydroxymethyl-3-(2'-tetrahydropyranyloxy)-steroid of the 19-norcholesta-1,3,5(10)-triene and estra-1,3,5(10)-triene series, comprising reacting with sodium borohydride in a solvent selected from the group consisting of methanol, ethanol, dioxane, water and mixtures thereof or with lithium aluminum hydride in a solvent selected from the group consisting of tetrahydrofurane and ethyl ether, a member selected from the group consisting of a 2'-formyl-3-(2'-tetrahydropyranyloxy) - 19-nor-cholesta - 1,3,5(10)-triene and a 2-formyl-3-(2'-tetrahydropyranyloxy)estra-1,3,5(10)-triene.

17. A process for the preparation of a compound of the formula:

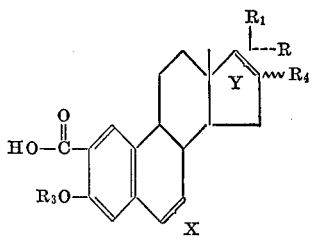

wherein R is a member selected from the group consisting of hydrogen, lower alkyl, —CH=CH—$R_a$, —C≡C—$R_a$, 2'-tetrahydropyranyloxy and acyloxy in which the acyl radical is derived from a carboxylic acid having 2 to 10 carbon atoms; $R_1$ is a member selected from the group consisting of hydrogen, 2'-tetrahydropyranyloxy, lower alkoxy and acyloxy in which the acyl radical is derived from a carboxylic acid having 2 to 10 carbon atoms; or R and $R_1$ together comprise a member selected from the group consisting of keto and ethylendioxy; $R_3$ is a member selected from the group consisting of hydrogen, 2'-tetrahydropyranyl, $C_6H_5CH_2$, lower alkyl and an acyl radical derived from a carboxylic acid having 2 to 10 carbon atoms; $R_4$ is a member selected from the group consisting of H, Cl and methyl; and X and Y are each members selected from the group consisting of a single and a double bond, $R_a$ being selected from the group consisting of hydrogen and lower alkyl, comprising reacting with an oxidizing agent selected from the group consisting of chromosulfuric mixture, pyridine and chromic anhydride, $KMnO_4$ and acetic acid, and silver ammonium nitrate, a compound of the formula:

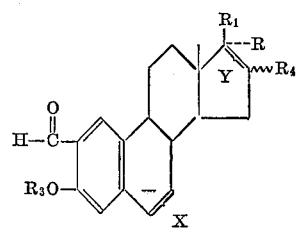

wherein R, $R_1$, $R_3$, $R_4$, and X and Y have the same meaning as above.

18. A process for the preparation of a compound of the formula:

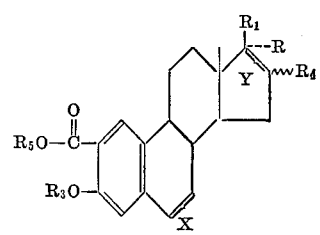

wherein R is a member selected from the group consisting of hydrogen, lower alkyl, —CH=CH—$R_a$, —C≡C—$R_a$, 2'-tetrahydro-pyranyloxy and acyloxy in which the acyl radical is derived from a carboxylic acid having 2 to 10 carbon atoms; $R_1$ is a member selected from the group consisting of hydrogen, 2'-tetrahydropyranyloxy, lower alkoxy and acyloxy in which the acyl radical is derived from a carboxylic acid having 2 to 10 carbon atoms; or R and $R_1$ together comprise a member selected from the group consisting of keto and ethylendioxy; $R_3$ is a member selected in the group consisting of hydrogen, 2'-tetrahydropyranyl, $C_6H_5CH_2$, lower alkyl and an acyl radical derived from a carboxylic acid having 2 to 10 carbon atoms; $R_4$ is a member selected from the group consisting of H, Cl, Br, I, methyl, allyl, propyl, ethyl and hydroxyl; $R_5$ is a member selected from the group consisting of lower alkyl, $C_6H_5CH_2$ and phenyl; and X and Y are each a member selected from the group consisting of a single and a double bond, $R_a$ being a member selected from the group consisting of hydrogen and lower alkyl, comprising reacting a compound of the formula:

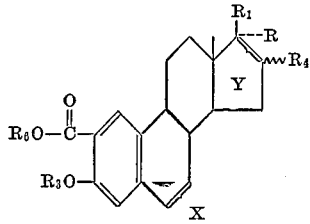

wherein R, $R_1$, $R_3$, $R_4$, X and Y have the same meaning as above and $R_6$ is a member selected from the group consisting of H, Na and K in a solvent medium with a compound selected from the group consisting of thionyl chloride and oxalyl chloride and reacting the resulting 2-carboxy-chloride with an anhydrous alcohol selected from the group consisting of a lower alkanol, phenol and benzyl alcohol.

19. A process for the preparation of a compound of the formula:

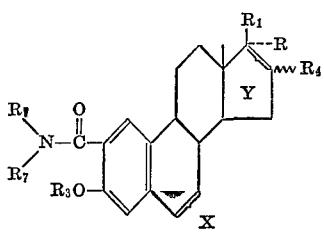

wherein R is a member selected from the group consisting of hydrogen, lower alkyl, $-CH=CH-R_a$, $-C\equiv C-R_a$, 2'-tetrahydropyranyloxy, and acyloxy in which the acyl radical is derived from a carboxylic acid having 2 to 10 carbon atoms; $R_1$ is a member selected from the group consisting of hydrogen, 2'-tetrahydropyranyloxy, lower alkoxy and acyloxy in which the acyl radical is derived from a carboxylic acid having 2 to 10 carbon atoms; or R and $R_1$ together comprise a member selected from the group consisting of keto and ethylendioxy; $R_3$ is a member selected from the group consisting of hydrogen, 2'-tetrahydropyranyl, $C_6H_5CH_2$, lower alkyl and an acyl radical derived from a carboxylic acid having 2 to 10 carbon atoms; $R_4$ is a member selected from the group consisting of H, Cl, Br, I, methyl, allyl, propyl, ethyl and hydroxy; $R_7$ is a member selected from the group consisting of hydrogen, lower alkyl, phenyl, $C_6H_5NH_2$, $NH_2$ and $C_6H_5CH_2$, and X and Y are each a member selected from the group consisting of a single and a double bond, $R_a$ being a member selected from the group consisting of hydrogen and lower alkyl, comprising reacting a compound of the formula:

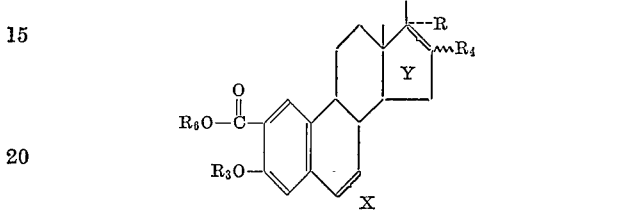

wherein R, $R_1$, $R_3$, $R_4$, X and Y have the same meaning as above and $R_6$ is a member selected from the group consisting of H, Na and K, in a solvent selected from the group consisting of benzene and ether, with a member selected from the group consisting of thionyl chloride and oxalyl chloride, and reacting the resulting 2-carboxy-chloride with a compound selected from the group consisting of ammonia, hydrazine, phenylhydrazine, a lower alkyl amine, aniline and benzylamine.

References Cited

UNITED STATES PATENTS 3,135,743   6/1964   Clinton et al. _____ 260—239.55

OTHER REFERENCES

Loewenthal, Tetrahedron vol. 6, No. 4, June 1959, p. 303.
Fieser et al., Steroids (1959) p. 476 and 583.
Kaneko et al., Chem. and Phar. Bull. (1963) p. 264.
Dyerassi, Steroid Reactions (1963) p. 136 and 389.

HENRY A. FRENCH, Primary Examiner

U.S. Cl. X.R.

260—397.1, 397.4, 397.5, 999